US012614216B2

(12) United States Patent
Mossoba et al.

(10) Patent No.: US 12,614,216 B2
(45) Date of Patent: *Apr. 28, 2026

(54) PREEMPTIVE TRANSACTION ANALYSIS

(71) Applicant: Capital One Services, LLC, McLean, VA (US)

(72) Inventors: Michael Mossoba, Great Falls, VA (US); Joshua Edwards, Philadelphia, PA (US); Abdelkadar M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,293

(22) Filed: Feb. 5, 2024

(65) Prior Publication Data

US 2024/0185315 A1     Jun. 6, 2024

Related U.S. Application Data

(63) Continuation of application No. 17/664,438, filed on May 23, 2022, now Pat. No. 11,915,282, which is a
(Continued)

(51) Int. Cl.
*G06Q 30/06* (2023.01)
*G06Q 20/40* (2012.01)
(Continued)

(52) U.S. Cl.
CPC ......... *G06Q 30/0601* (2013.01); *G06Q 20/40* (2013.01); *G06Q 20/401* (2013.01);
(Continued)

(58) Field of Classification Search
CPC ........... G06Q 30/0601; G06Q 30/0633; G06Q 30/0623; G06Q 30/0625; G06Q 30/0637;
(Continued)

(56) References Cited

U.S. PATENT DOCUMENTS 6,278,481 B1 * 8/2001 Schmidt ............... H04N 1/2116
348/375
7,324,964 B2 1/2008 Gronberg et al.
(Continued)

FOREIGN PATENT DOCUMENTS

CN       102812488 A    12/2012
CN       108492138 A     9/2018
(Continued)

OTHER PUBLICATIONS

Sagar P. Jumde, et al ; "Fraud Detection with the Help of Hidden Markov Model and Neural Network"; "National Level Conference" On Mar. 9, 2013 , Yavatmal [MS] India retrieved from Dialog on Sep. 21, 2024 (Year: 2013).*
(Continued)

*Primary Examiner* — Yogesh C Garg
(74) *Attorney, Agent, or Firm* — Harrity & Harrity, LLP

(57) ABSTRACT

A method may include receiving activity data associated with a user, wherein the activity data relates to online activity involving a product type, identifying the product type associated with the activity data, and predicting, based on the activity data, that the user is likely to purchase a product of the product type. The method may include generating, based on predicting that the user is likely interested in purchasing the product of the product type, an annotation to indicate that a potential transaction to purchase the product is forthcoming, and storing the annotation in a profile associated with an account of the user. The method may include detecting a transaction to purchase the product, wherein the transaction involves a payment from the account, and performing an action associated with a fraud analysis of the transaction based on the annotation.

20 Claims, 8 Drawing Sheets

Related U.S. Application Data continuation of application No. 16/729,949, filed on Dec. 30, 2019, now Pat. No. 11,341,548, which is a continuation of application No. 16/241,688, filed on Jan. 7, 2019, now Pat. No. 10,521,837.

(51) Int. Cl.
 G06Q 30/0601 (2023.01)
 H04L 9/40 (2022.01)

(52) U.S. Cl.
 CPC ..... G06Q 20/4016 (2013.01); G06Q 30/0623 (2013.01); G06Q 30/0624 (2025.08); G06Q 30/0625 (2013.01); G06Q 30/0633 (2013.01); G06Q 30/0637 (2013.01); H04L 63/1408 (2013.01)

(58) Field of Classification Search
 CPC .. G06Q 20/401; G06Q 20/40; G06Q 20/4016; G06Q 30/0624
 USPC ........................................................ 705/75
 See application file for complete search history.

(56) References Cited

U.S. PATENT DOCUMENTS

| | | | |
|---|---|---|---|
| 7,398,925 | B2 | 7/2008 | Tidwell et al. |
| 7,769,638 | B1 | 8/2010 | Mollett et al. |
| 8,032,449 | B2 | 10/2011 | Hu et al. |
| 8,146,156 | B2 | 3/2012 | King et al. |
| 8,271,394 | B1 | 9/2012 | Bogaard |
| 8,751,486 | B1 | 6/2014 | Neeman et al. |
| 9,836,733 | B2 | 12/2017 | Course et al. |
| 10,134,040 | B2 | 11/2018 | Ding et al. |
| 10,354,184 | B1 | 7/2019 | Vitaladevuni et al. |
| 10,460,382 | B2 | 10/2019 | Dominguez |
| 10,521,837 | B1 | 12/2019 | Mossoba |
| 11,341,548 | B2 | 5/2022 | Mossoba et al. |
| 11,488,400 | B2 * | 11/2022 | Zucker ..................... G06N 3/08 |
| 2002/0123937 | A1 | 9/2002 | Pickover et al. |
| 2003/0069820 | A1 | 4/2003 | Hillmer et al. |
| 2003/0070080 | A1 * | 4/2003 | Rosen .................. G06Q 20/381 713/187 |
| 2007/0005437 | A1 | 1/2007 | Stoppelman |
| 2007/0050840 | A1 * | 3/2007 | Grandcolas .......... G07F 7/1008 726/5 |
| 2007/0119918 | A1 | 5/2007 | Hogg et al. |
| 2007/0198361 | A1 | 8/2007 | Ronning et al. |
| 2008/0114829 | A1 * | 5/2008 | Button .................... H04L 67/63 709/203 |
| 2009/0216571 | A1 | 8/2009 | Sunshine et al. |
| 2009/0265211 | A1 | 10/2009 | May et al. |
| 2010/0114654 | A1 | 5/2010 | Lukose et al. |
| 2011/0238510 | A1 | 9/2011 | Rowen et al. |
| 2011/0239158 | A1 * | 9/2011 | Barraclough ......... G06F 3/0482 715/808 |
| 2012/0109821 | A1 * | 5/2012 | Barbour ................. G06Q 40/02 705/44 |
| 2014/0006218 | A1 | 1/2014 | Muthu |
| 2014/0114743 | A1 * | 4/2014 | Fano .................. G06Q 30/0224 705/14.41 |
| 2014/0279280 | A1 | 9/2014 | Bennett et al. |
| 2015/0032625 | A1 | 1/2015 | Dill et al. |
| 2015/0127489 | A1 | 5/2015 | Vasthimal et al. |
| 2015/0134518 | A1 | 5/2015 | Turovsky et al. |
| 2015/0382195 | A1 | 12/2015 | Grim et al. |
| 2016/0014715 | A1 | 1/2016 | Patil et al. |
| 2016/0078471 | A1 | 3/2016 | Hamedi |
| 2017/0270544 | A1 | 9/2017 | Jaidka et al. |
| 2017/0364967 | A1 | 12/2017 | Parikh et al. |
| 2018/0096372 | A1 * | 4/2018 | Rickard, Jr. ............. G06N 5/01 |
| 2018/0174222 | A1 | 6/2018 | Venkatakrishnan et al. |
| 2018/0278552 | A1 | 9/2018 | Quock et al. |
| 2018/0285838 | A1 | 10/2018 | Franaszek et al. |
| 2018/0300788 | A1 | 10/2018 | Mattingly et al. |
| 2019/0012683 | A1 | 1/2019 | Jang et al. |
| 2019/0043056 | A1 | 2/2019 | Cowan |
| 2022/0284490 | A1 | 9/2022 | Mossoba et al. |

FOREIGN PATENT DOCUMENTS

| | | | |
|---|---|---|---|
| IN | 201500234 I3 | 7/2016 | |
| WO | WO-03054625 A1 * | 7/2003 | ............. G02B 30/34 |
| WO | WO-2017116769 A1 * | 7/2017 | ....... G06F 16/24578 |

OTHER PUBLICATIONS

Article, "Sober Q4 results expected to set tone for power sector in 2014"; Testa, Dan. SNL Energy Finance Daily [Charlottesville] Jan. 27, 2014, retrieved from Dialog on Sep. 21, 2024. (Year: 2014).*
N. Ramesh and T.-S. Moh, "Outfit Recommender System," 2018 IEEE/ACM International Conference on Advances in Social Networks Analysis and Mining (ASONAM), Barcelona, Spain, 2018, pp. 903-910, retrieved from IP. Com on Dec. 27, 2025 (Year: 2018).*
Bouhnik V., et al., "Behavioral Analysis: The Future of Fraud Prevention," Secured Touch, Dec. 27, 2015, pp. 1-12.

\* cited by examiner

100

160
Authorization platform may consider online activity and/or bypass one or more examinations of a fraud analysis based on the noted likely transaction involving product 1

Authorization platform

Fraud Analysis Platform

150
User A initiates a transaction involving Product 1

User A

170
Transaction approved

400

410 — Receive activity data associated with a user, wherein the activity data relates to online activity involving a product type 420 — Identify the product type associated with the activity data 430 — Predict, based on the activity data, that the user is likely to purchase a product of the product type 440 — Generate, based on predicting that the user is likely interested in purchasing the product of the product type, an annotation to indicate that a potential transaction to purchase the product is forthcoming 450 — Store the annotation in a profile associated with an account of the user 460 — Detect a transaction to purchase the product, wherein the transaction involves a payment from the account 470 — Perform an action associated with a fraud analysis of the transaction based on the annotation

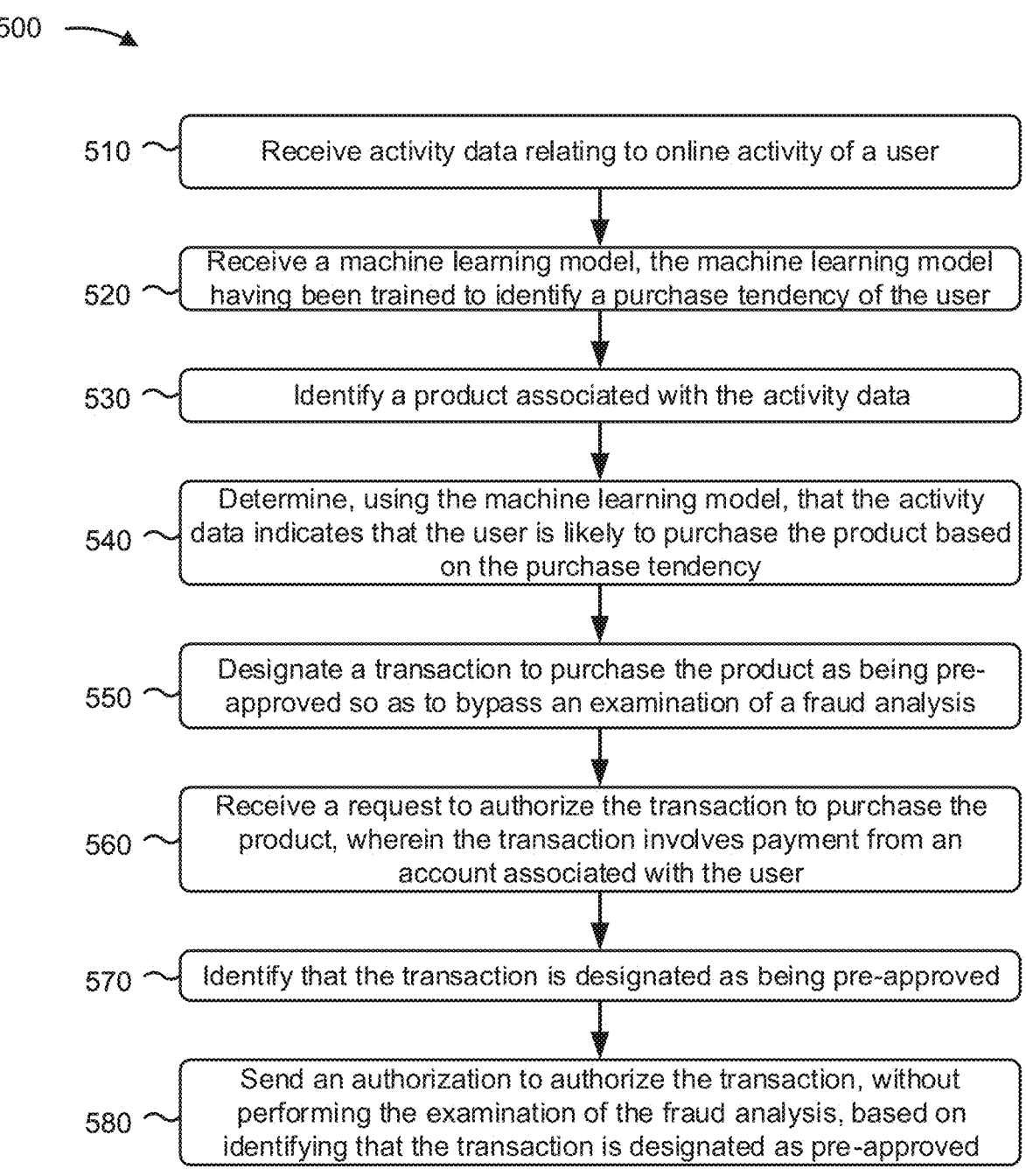

510 — Receive activity data relating to online activity of a user

520 — Receive a machine learning model, the machine learning model having been trained to identify a purchase tendency of the user 530 — Identify a product associated with the activity data 540 — Determine, using the machine learning model, that the activity data indicates that the user is likely to purchase the product based on the purchase tendency 550 — Designate a transaction to purchase the product as being pre-approved so as to bypass an examination of a fraud analysis 560 — Receive a request to authorize the transaction to purchase the product, wherein the transaction involves payment from an account associated with the user 570 — Identify that the transaction is designated as being pre-approved 580 — Send an authorization to authorize the transaction, without performing the examination of the fraud analysis, based on identifying that the transaction is designated as pre-approved

FIG. 5

600

610 — | Receive activity data associated with online activity of a user |

620 — | Identify a first product associated with the activity data |

630 — | Determine that the activity data indicates that the user is likely to purchase the first product |

640 — | Designate a transaction to purchase the first product as being pre-approved so as to bypass a fraud analysis in a future authorization of the transaction to purchase the first product |

650 — | After designating the transaction as being pre-approved, receive a request to authorize a transaction to purchase a second product, wherein the transaction to purchase the second product involves payment from an account associated with the user |

660 — | Determine that the second product is related to the first product |

670 — | Identify that the transaction to purchase the first product is designated as being pre-approved |

680 — | Send an authorization to authorize the transaction to purchase the second product based on identifying that the transaction to purchase the first product is designated as being pre-approved and identifying that the first product is related to the second product |

FIG. 6

PREEMPTIVE TRANSACTION ANALYSIS

RELATED APPLICATION

This application is a continuation of U.S. patent application Ser. No. 17/664,438, filed May 23, 2022, which is a continuation of U.S. patent application Ser. No. 16/729,949, filed Dec. 30, 2019 (now U.S. Pat. No. 11,341,548), which is a continuation of U.S. patent application Ser. No. 16/241, 688, filed Jan. 7, 2019 (now U.S. Pat. No. 10,521,837), the contents of which are incorporated herein by reference in their entireties.

BACKGROUND

A transaction can be analyzed to determine a probability that the transaction is an authorized transaction (e.g., a user associated with an account has authorized the transaction) or a fraudulent transaction (e.g., the transaction is being performed by an unauthorized user). Financial institutions may perform fraud analysis by analyzing one or more characteristics (e.g., location, timing, and/or the like) of the transaction to determine a probability that the transaction is fraudulent. Based on that probability, the transaction can be authorized and/or denied.

SUMMARY

According to some implementations, a method may include receiving activity data associated with a user, wherein the activity data relates to online activity involving a product type, identifying the product type associated with the activity data, and predicting, based on the activity data, that the user is likely to purchase a product of the product type. The method may include generating, based on predicting that the user is likely interested in purchasing the product of the product type, an annotation to indicate that a potential transaction to purchase the product is forthcoming, and storing the annotation in a profile associated with an account of the user. The method may include detecting a transaction to purchase the product, wherein the transaction involves a payment from the account, and performing an action associated with a fraud analysis of the transaction based on the annotation.

According to some implementations, a device may include one or more memories, and one or more processors, communicatively coupled to the one or more memories, to receive activity data relating to online activity of a user. The one or more processors may receive a machine learning model, the machine learning model having been trained to identify a purchase tendency of the user. The one or more processors may identify a product associated with the activity data, and may determine, using the machine learning model, that the activity data indicates that the user is likely to purchase the product based on the purchase tendency. The one or more processors may designate a transaction to purchase the product as being preapproved so as to bypass an examination of a fraud analysis. The one or more processors may receive a request to authorize the transaction to purchase the product, wherein the transaction involves payment from an account associated with the user. The one or more processors may identify that the transaction is designated as being preapproved, and may send an authorization to authorize the transaction, without performing the examination of the fraud analysis, based on identifying that the transaction is designated as preapproved.

According to some implementations, a non-transitory computer-readable medium may store instructions that include one or more instructions that, when executed by one or more processors of a device, cause the one or more processors to receive activity data associated with online activity of a use. The one or more instructions may cause the one or more processors to identify a first product associated with the activity data, and to determine that the activity data indicates that the user is likely to purchase the first product. The one or more instructions may cause the one or more processors to designate a transaction to purchase the first product as being preapproved so as to bypass a fraud analysis in a future authorization of the transaction to purchase the first product. The one or more instructions may cause the one or more processors to, after designating the transaction as being preapproved, receive a request to authorize a transaction to purchase a second product, wherein the transaction to purchase the second product involves payment from an account associated with the user. The one or more instructions may cause the one or more processors to determine that the second product is related to the first product, and to identify that the transaction to purchase the first product is designated as being preapproved. The one or more instructions may cause the one or more processors to send an authorization to authorize the transaction to purchase the second product based on identifying that the transaction to purchase the first product is designated as being preapproved and identifying that the first product is related to the second product.

BRIEF DESCRIPTION OF THE DRAWINGS

FIGS. 4-6 are flow charts of example processes associated with example implementations described herein.

DETAILED DESCRIPTION

Figure 1A:
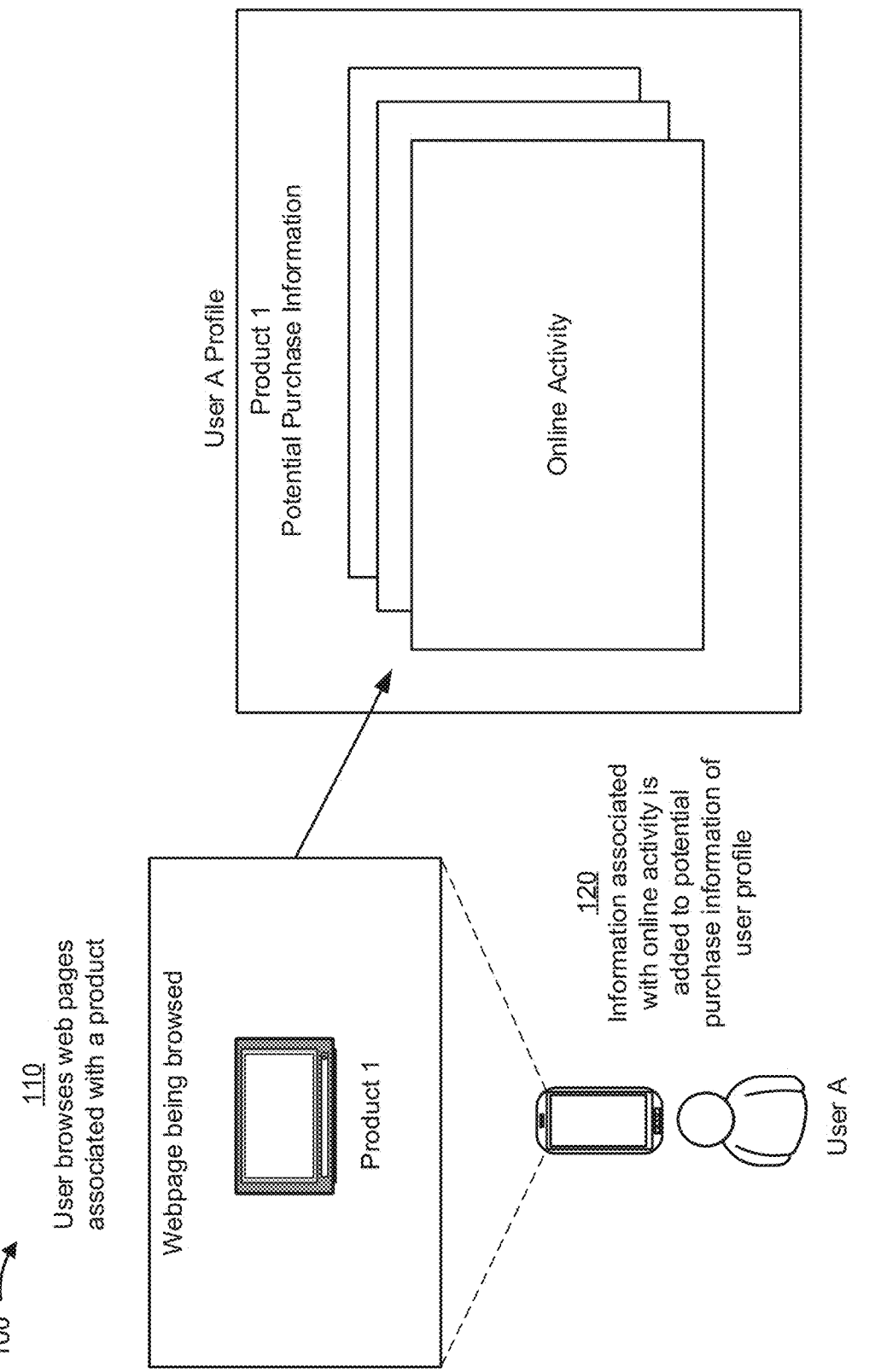
FIGS. 1A-1C are diagrams of an example implementation described herein.

The following detailed description of example implementations refers to the accompanying drawings. The same reference numbers in different drawings may identify the same or similar elements.

In many instances, a fraud analysis is to be performed for a transaction involving a financial institution (e.g., a bank, a credit union, and/or the like). The financial institution may perform thousands, millions, or more such fraud analyses of transactions every day. In most cases, the fraud analyses are to be performed in real-time, so that an authorized user involved in the transactions may purchase products and/or services and so that unauthorized users are prevented from making such purchases (e.g., because the unauthorized users fraudulently are using a payment method associated with the financial institutions). In some instances, a fraud analysis performed by the financial institution can involve a plurality of examinations of characteristics of the transaction and/or a user account associated with the transaction. For example, the fraud analysis can include an examination of a user's transaction history, an examination of the cost of the transaction, an examination of a location of the transaction, an examination of the type of the transaction (e.g., online or in-person), and/or the like. Accordingly, the more examinations involved in the fraud analysis, the longer the fraud analysis may take and the longer a user may have to wait (e.g., during checkout) for the transaction to be authorized. Furthermore, the more examinations involved in the fraud analysis, the more processing resources and/or network resources that are used by the financial institutions to perform the fraud analysis and ultimately authorize or deny the transaction.

Some implementations described herein provide an authorization platform that may perform a preemptive transaction analysis. The preemptive transaction analysis may occur before a transaction is initiated by the user. As described herein, the authorization platform may preemptively bypass one or more examinations of a fraud analysis performed for a transaction and/or preemptively authorize the transaction. According to some implementations, the authorization platform may receive information describing activity (e.g., online activity) associated with a user, predict that the user is interested in purchasing a product based on the activity, receive a request to authorize a transaction associated with the product, bypass one or more examinations of a fraud analysis for the transaction based on predicting that the user is interested in the product, and/or authorize the transaction to enable the user to purchase the product. Therefore, the authorization platform, based on the monitored activity of the user, may bypass one or more examinations of a fraud analysis, thus conserving computing resources and/or network resources associated with performing the one or more examinations of the fraud analysis. Bypassing the one or more examinations may further conserve transaction processing time and, thus, enhance the user experience when purchasing the product because less of the user's time is spent waiting for the transaction to be authorized. Furthermore, the authorization platform may use the online activity to preemptively perform one or more examinations of a fraud analysis, and thus increase accuracy with respect to detecting a fraudulent transaction. For example, before a transaction for a product is initiated, the authorization platform may perform the one or more examinations based on characteristics of the product identified in the online activity. Accordingly, the increased accuracy may conserve any computing resources and/or network resources involved in correcting any fraudulent transactions that would have been allowed and/or correcting any non-fraudulent transactions that would have been denied without the use of the example fraud analysis described herein.

Furthermore, several different stages of a process for performing a fraud analysis and/or determining whether one or more examinations of a fraud analysis for a transaction can be bypassed are automated, thus removing human subjectivity and waste from the process, and improving speed and efficiency of the process and conserving computing resources (e.g., processor resources, memory resources, and/or the like). Furthermore, implementations described herein use a rigorous, computerized process to perform tasks or activities that were not previously performed. For example, currently there does not exist a technique to predict that a user is interested in purchasing a product, generate an annotation to indicate that a potential transaction to purchase the product is forthcoming, receive a request to authorize a transaction for the product, and perform an action associated with a fraud analysis for the transaction based on the annotation and/or authorize the transaction based on the annotation. In some implementations, one or more examinations of the fraud analysis of the transaction may be bypassed. Accordingly, computing resources associated with performing a fraud analysis, as described herein, can be conserved. Finally, automating the process for determining whether one or more examinations of a fraud analysis can be bypassed, as described herein, conserves computing resources (e.g., processor resources, memory resources, and/or the like) that would otherwise be wasted by performing a full fraud analysis of the transaction without bypassing one or more examinations based on predicting that a user is interested in a product.

As used herein, a "merchant" may refer to any individual or organization involved in the sale or leasing of goods or services. For example, a merchant may be a trader, a retailer, a vendor, a seller, a lessor, and/or the like. As used herein, an "authorization platform" may be any platform configured to approve or deny a pending transaction (e.g., a transaction to purchase a product from a merchant). An authorization platform may include and/or be associated with a fraud analysis platform to enable the authorization platform to perform and/or receive a fraud analysis of the transaction to determine whether to approve or deny the transaction.

Figure 1B:
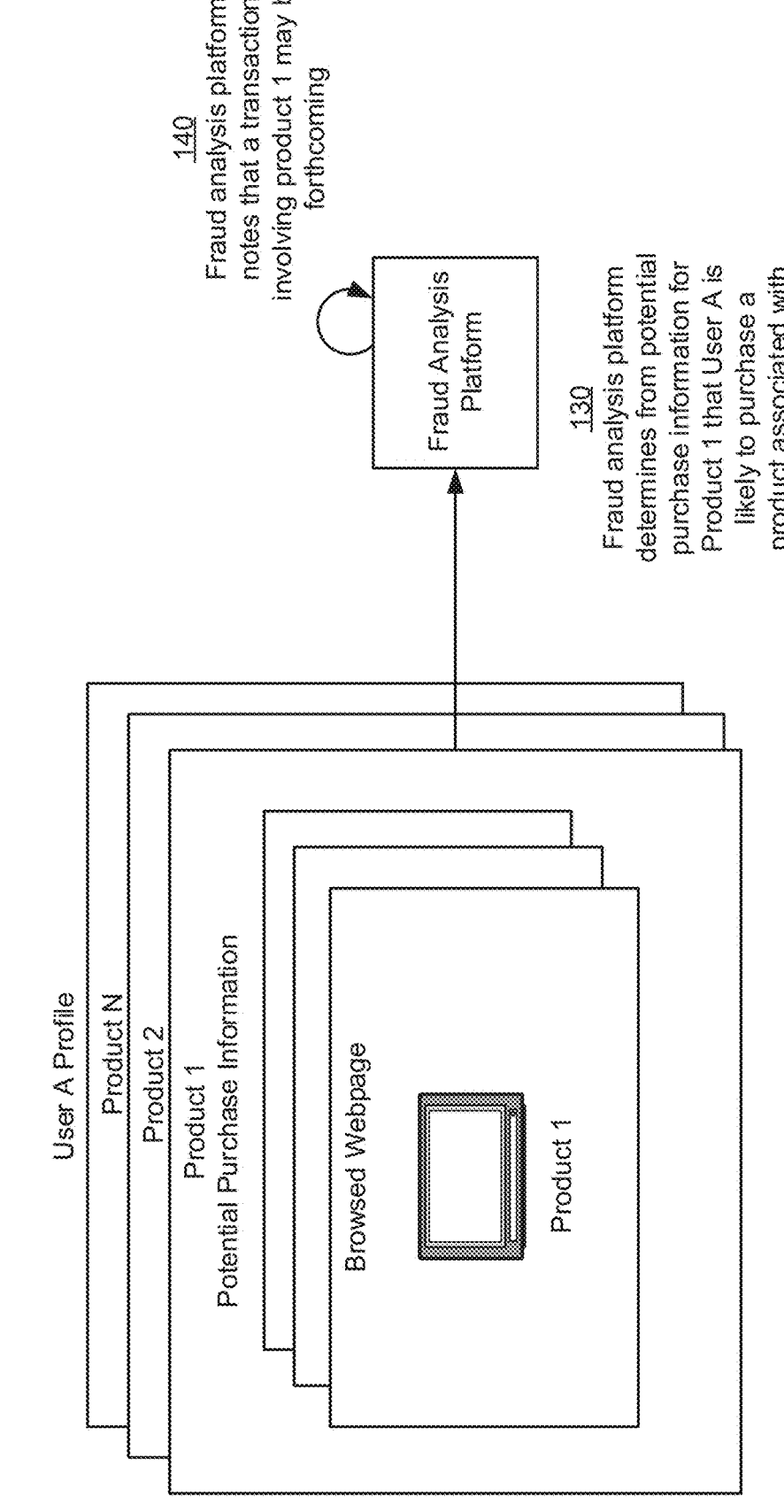
Figure 1C:
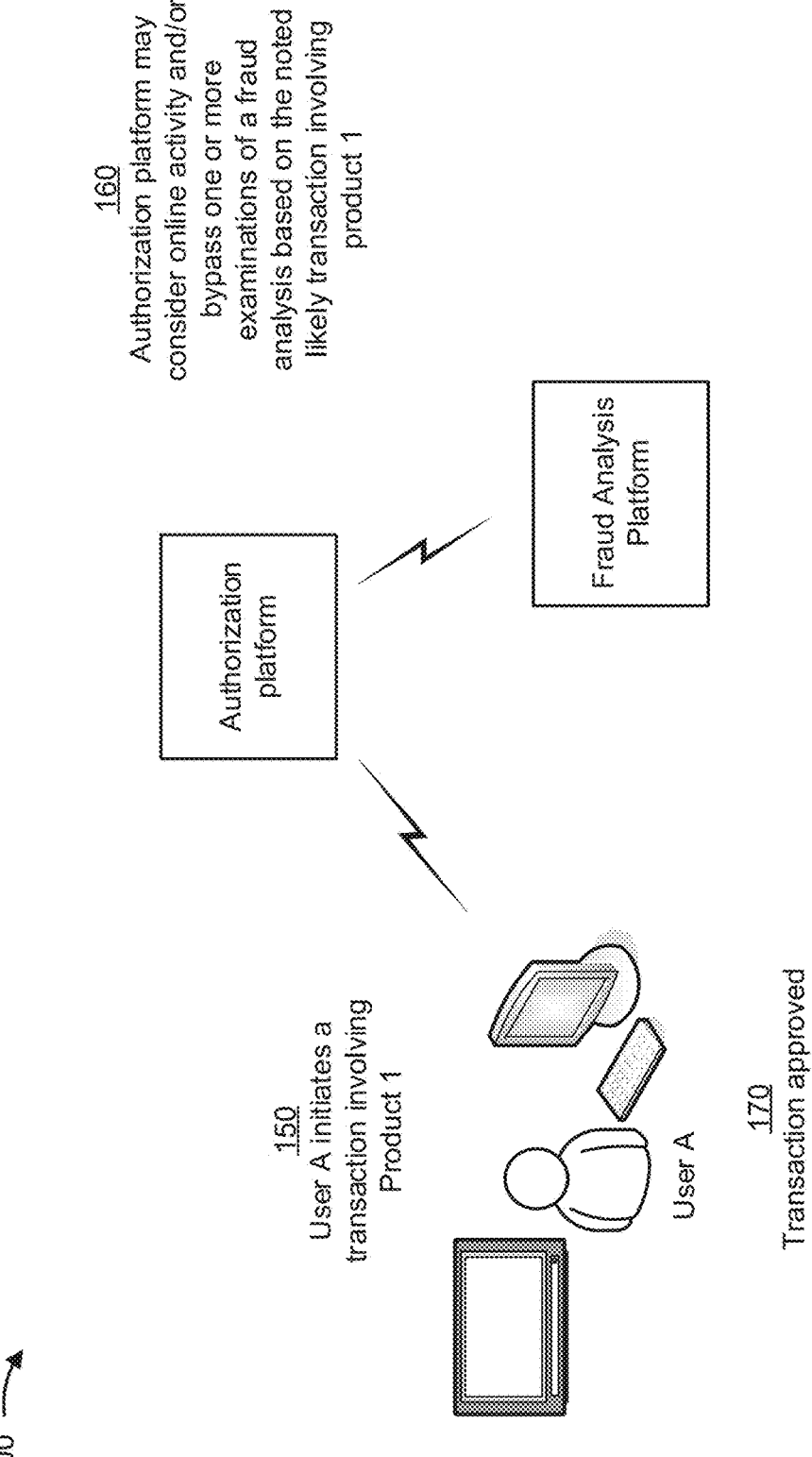

FIGS. 1A-1C are diagrams of an example implementation 100 described herein. In example implementation 100 of FIGS. 1A-1C, a user's online activity is monitored and analyzed to determine whether the user is likely to purchase a particular product. Based on an analysis of the user's online activity (or any shopping behavior), a fraud analysis platform (which may be associated with an authorization platform) may determine that a transaction associated with the product (e.g., a transaction to purchase the product) is forthcoming and/or may designate the purchase of the product as preapproved based on the monitored activity. In some implementations, the fraud analysis platform may determine that one or more examinations of a fraud analysis can be bypassed based on the monitored activity because the activity indicated that the user (e.g., assumed to be an authorized user) was intending to purchase the product. Therefore, using information from the fraud analysis platform, an authorization platform may perform a fraud analysis to approve and/or deny a transaction to purchase the product.

As shown in FIG. 1A, and by reference number 110, a user (e.g., shown as User A) browses webpages associated with a product (e.g., shown as Product 1). For example, User A may browse the webpages using a browser (e.g., on a user device) to research information on Product 1, which is shown to be a television. Such online activity and/or similar online activity (e.g., social media activity, searches, sending messages, accessing media, and/or the like) involving Product 1 may indicate that User A is interested in purchasing the product and/or may be used to determine User A's level of interest in purchasing the product. Similarly, in some implementations, other activity can be monitored (e.g., capturing an image of the product with the user device, sending a message identifying the product, accessing offline media associated with the product, purchasing related products, traveling to a location of a merchant that sells the product, and/or the like) to predict whether a user is interested in a product.

Additionally, or alternatively, the user may browse, search, access, and/or view information on related products that are associated with the product. For example, assuming Product 1 is a television, User A may also browse and/or search for related products, such as home theater systems, video players, and/or other products associated with and/or used in conjunction with a television. Such activity associated with related products may also indicate an interest in Product 1 and/or be used to determine a likelihood that User A is interested in purchasing Product 1. As described herein, a threshold amount of such activity (e.g., a number of web pages browsed, a number of searches, an amount of information accessed or viewed, a duration of time associated with the activity, and/or the like) associated with Product 1 may indicate that the user is likely to purchase the product (e.g., there is a threshold probability that the user is going to purchase the product).

While example implementation 100 focuses on online activity, some implementations described herein are not so limited. For example, activity associated with a user adding a product to a shopping cart (which can be monitored through cameras, radio frequency identification (RFID) on the products, smart shopping carts that track or detect the RFID, and/or the like), activity associated with a location of the user (e.g., via a global positioning system (GPS) of the user device), activity associated with the user being at a particular event or being scheduled to go to a particular event, activity associated with a user performing past purchases of related products. Accordingly, one or more activities may involve a user's action, a user's location, and/or other similar activity or characteristics of the activity.

In example implementation 100, the online activity may be monitored on a user device associated with a user. The user device of example implementation 100 is shown as a smartphone, though other user devices associated with User A, such as computers, tablets, and/or the like can additionally, or alternatively, be monitored. The online activity may be monitored via an application running on the user device and/or an application (e.g., an applet, an application programming interface, a plug-in, a browser extension, and/or the like) installed on a browser of the user device. The online activity may be monitored using any suitable techniques, such as scraping hypertext markup language (HTML) associated with the online activity, capturing search strings associated with the online activity, and/or the like. According to some implementations, a user (e.g., user A) using the user device may be deemed to be an authorized user of an account associated with the application based on the user device being unlocked by the user. For example, User A may log into the user device and/or the application using a password, a biometric analysis (e.g., a fingerprint analysis, facial recognition, and/or the like), authentication token, and/or the like. In some implementations, the application (and/or the account associated with the application) may be associated with a particular entity, such as a financial institution (e.g., a banking application), a merchant (e.g., a merchant application to enable online shopping with a merchant), and/or the like. Similarly, any other accounts (e.g., bank accounts, member accounts, and/or the like) associated with such an entity may also be linked to the user.

As further shown in FIG. 1A, and by reference number 120, information associated with the online activity is added to potential purchase information of a profile (e.g., a user profile). For example, as shown, activity data that is representative of the online activity, such as past browsed webpages, associated with Product 1 are stored in User A's profile (referred to herein as "the profile"). The profile may be implemented as any suitable data structure such as a database, a table, an index, a graph, and/or the like. The profile may be stored and/or maintained partially or entirely in a data structure of the user device, partially or entirely in a data structure of an authorization platform that authorizes transactions involving User A, and/or partially and/or entirely by another device to which the authorization platform has access. The profile may be stored as account information that is associated with the user. For example, the profile information may be stored by writing data to a local file or data structure, sending the account information to a remote data structure for storage, and/or the like. In some implementations, if the profile is partially or entirely stored locally, the user device may provide information from the profile to the authorization platform periodically, based on the activity being added to the profile, and/or the like.

In some implementations, the profile may be unstructured data (e.g., data that is not organized). For example, the user device may store online activity (e.g., a browsing history, social media activity, and/or the like) and/or content of the online activity in the profile as unstructured data. Accordingly, the online activity may not be sorted according to any content (e.g., by product, merchant, and/or the like) and/or source (e.g., webpage, social media platform, and/or the like) associated with online activity. In some implementations, the user device may forward unstructured online activity to an authorization platform, which organizes the unstructured data to identify activity that indicates potential products that the user may have an interest in purchasing. Additionally, or alternatively, the user device may store the online activity as structured data (e.g., data that is organized according to product, product type, online browsing history, online browsing type, source, merchant, and/or the like) associated with the user's online activity.

In some implementations, a user may provide access information and/or enable monitoring of the user's online activity (and/or offline activity). For example, upon installing an application on the user device and/or on a browser of the user device, the application may request (e.g., via an authentication token) that User A authorize monitoring of User A's online activity. Such a request may indicate to User A that the monitoring is for fraud analysis purposes. With an approval authorizing the monitoring of User A's online activity (e.g., received via a user input from User A), the application may periodically (e.g., hourly, daily, and/or the like) or aperiodically (e.g., based on an event, such as the user opening a browser, performing a search through the browser, shopping online, and/or the like) add activity data representative of the online activity associated with User A to the profile. The request may enable User A to opt out from being monitored by the application.

As shown in FIG. 1B, and by reference number 130, a fraud analysis platform determines, from the potential purchase information for Product 1, that User A is likely to purchase Product 1. In FIG. 1B, the fraud analysis platform obtains potential purchase information associated with Product 1 from the profile. The potential purchase information may include information corresponding to the online activity of User A. In some implementations; the fraud analysis platform may receive potential purchase information for a plurality of products (shown as N products, where N is an integer and greater than 1) associated with online activity of User A.

As mentioned above, the profile may be organized into structured data by the fraud analysis platform (and/or an authorization platform associated with the fraud analysis platform). For example, the fraud analysis platform may analyze the received online activity using one or more of an image processing technique (e.g., object detection of images of captured images of the online activity, edge detection of images of the online activity, and/or the like), a text processing technique, and/or a code processing technique to recognize one or more products in the received online activity. The one or more products may be identified based on an object recognition model, an entity recognition model, and/or the like to distinguish between products included in the online activity. In some implementations, the fraud analysis platform may organize the potential purchase information of the profile by tagging the online activity with an identifier associated with the product. In some implementations, the product may correspond to a specific product having a particular make, model, manufacturer, and/or the like. Additionally, or alternatively, the product may correspond to a type of product (e.g., a television, a flat screen television, a projector, and/or the like). The type of the product may be determined using one or more data structures (e.g., a table, a database, an index, a graph, and/or the like) that maps one or more products (and/or characteristics of the products) to one or more types (e.g., categories) of products. Accordingly, to determine the type of product, the fraud analysis platform may reference the data structure to look up one or more characteristics of the product (e.g., make, model, manufacturer, description, and/or the like) to identify the product. Therefore, the profile can be organized according to particular products and/or according to particular types of products. Accordingly, as shown in FIG. 1B, potential purchase information for a particular product may be derived from and/or include the online activity of a user and may be organized within the profile based on products identified within the online activity. In some implementations, the potential purchase information may correspond to a particular product type. The product type may be defined by one or more of a product associated with a particular merchant, a particular industry, a particular category, a particular topic, a particular use, a particular service, and/or the like.

In some implementations, the fraud analysis platform may use a machine learning model, such as a product recognition model, to identify a product associated with the online activity, to identify related products associated with a product of the online activity, and/or the like. For example, the fraud analysis platform may train the product recognition model based on one or more parameters associated with identifying a product, such as an identifier (e.g., a model number, a name, and/or the like) of the product, a make or manufacturer of the product, an image of the product, one or more specifications of the product, one or more features of the product, a type of the product, a category associated with the product, an industry associated with the product, and/or the like. The fraud analysis platform may train the machine learning model using historical data associated with identifying a product according to the one or more parameters. Using the historical data and the one or more parameters as inputs to the product recognition model, the fraud analysis platform may identify a product and/or related product to permit the fraud analysis platform to analyze and/or organize the potential purchase information of the profile. Furthermore, one or more characteristics of identified products can be compared to determine whether the products are related, as described herein. For example, if a characteristic of a first product substantially matches a characteristic of a second product (e.g., both products are used in home entertainment), then the fraud analysis platform may determine that the products are related.

In example implementation 100, the fraud analysis platform may analyze the potential purchase information associated with Product 1 to determine the likelihood that User A is going to purchase Product 1. For example, the fraud analysis platform may determine that User A is likely to purchase Product 1 based on frequent access to one or more webpages about Product 1, from frequent access to one or more reviews of Product 1, from one or more mentions or likes of Product 1 in social media, and/or the like. Accordingly, the fraud analysis platform may measure the amount of online activity associated with the product. Such a measure may include a number and/or frequency of web pages accessed, reviews accessed, mentions and/or likes made in social media, searches performed, and/or the like that include and/or are associated with the product. Accordingly, the fraud analysis platform, once the amount of online activity satisfies a threshold, may determine that User A is likely to purchase Product 1. In some implementations, the threshold may be specific to User A, specific to a product type associated with Product 1, and/or specific to Product 1. Such thresholds may be based on historical data and/or information associated with User A's purchasing tendency, purchases made involving Product 1, and/or purchases made involving product types associated with Product 1.

In some implementations, the fraud analysis platform may use a machine learning model, such as a purchase tendency model, to determine from the potential purchase information that a user is likely to purchase a product and/or a product type. For example, the fraud analysis platform may train the purchase tendency model based on one or more parameters associated with determining a probability that a user is going to purchase a product or a type of product, such as an amount of online activity associated with the product, a period of time and/or timing associated with the online activity (e.g., a length of time, time of day, week, month, and/or the like), the type of online activity (e.g., web browsing, social media activity, query searching, email access, and/or the like), one or more merchants in the online activity, an object (e.g., a product and/or an item associated with the product) of the online activity, and/or the like. The amount of online activity may correspond to one or more webpages associated with the product that are accessed, a frequency with which the webpages were accessed, a number of searches associated with the product, an amount of media (e.g., images, video, audio, and/or the like) associated with the product that was accessed, any purchases or access to products related to the product, a number of reviews associated with the product that were accessed, an amount of social media activity (e.g., likes, comments, follows, and/or the like) associated with the product, a number of messages (e.g., emails, texts, social media messages, and/or the like) sent or received that are associated with the product, and/or the like. In some implementations, the fraud analysis platform may train the purchase tendency model using historical data associated with the user and/or a plurality of other users purchasing the product according to the one or more parameters. Additionally, or alternatively, the fraud analysis platform may train the purchase tendency model using historical data associated with purchasing one or more other products (e.g., one or more other products associated with the product) according to the one or more parameters. Using the historical data and the one or more parameters, associated with determining a probability that a user is going to purchase a product or a type of product, as inputs to the purchase tendency model, the fraud analysis platform may determine a purchase tendency of the user and/or a probability that the user is likely to purchase the product to perform a fraud analysis for a transaction of the product and/or determine which examinations of the fraud analysis are to be performed.

In this way, the fraud analysis platform may determine from a user's online activity, a likelihood or probability that the user is going to purchase a product to permit the fraud analysis platform to indicate (e.g., to an authorization platform) that a transaction involving the product is forthcoming and/or may be preapproved.

As further shown in FIG. 1B, and by reference number 140, the fraud analysis platform notes that a transaction involving Product 1 may be forthcoming. For example, the fraud analysis platform may notify an authorization platform that User A is likely to purchase Product 1 (e.g., based on the online activity).

As described herein, an authorization platform may be configured to detect potential fraud associated with transactions involving a financial account of a user. For example, the authorization platform may be associated with a same financial institution as the application that is used to monitor User A's online activity. In some implementations, the fraud analysis platform of example implementation 100 may be associated with an authorization platform, a component of an authorization platform, and/or a module of an authorization platform.

In some implementations, the fraud analysis platform may generate an annotation to indicate that a user is likely to purchase a product and/or that a purchase of the product is unlikely to be fraudulent. For example, the fraud analysis platform may generate an annotation to indicate that a transaction to purchase Product 1 is forthcoming, indicating to the authorization platform that User A is interested in purchasing Product 1. As described herein, the authorization platform may use and/or obtain the annotation to bypass one or more examinations of a fraud analysis associated with a transaction for Product 1. The annotation may be added or included within the profile for User A, sent via a message, and/or the like.

In some implementations, the annotation may serve as an authorization flag to indicate that a transaction involving the product may be preapproved. In such cases, the transaction may be preapproved in that the authorization platform may bypass one or more examinations of a fraud analysis of the transaction. For example, the authorization platform may bypass an examination of whether the transaction is fraudulent based on the location of the purchase, an examination of whether the transaction is fraudulent based on the type of the product, an examination of whether the transaction is fraudulent based on a merchant involved in the transaction, an examination of whether the transaction is fraudulent based on the type of transaction (e.g., online or in-person), and/or the like.

In some implementations, the fraud analysis platform may preapprove a transaction according to one or more examinations to permit one or more corresponding examinations of the transaction to be bypassed during the fraud analysis of the transaction. For example, the fraud analysis platform may determine, prior to any received notification of a pending transaction for the product, whether a potential transaction may be fraudulent using one or more examinations of the online activity and/or the measured purchasing tendency of the user. More specifically, the fraud analysis platform may determine whether a transaction involving the product, itself, has a higher or lower likelihood of being involved in fraudulent transactions, whether merchants of the online activity have a higher or lower likelihood of being involved in fraudulent transactions, whether a particular type of transaction (e.g., online or in-person) involving the transaction is likely fraudulent, and/or the like. In such cases, the fraud analysis platform may perform an analysis of a potential transaction for a product to bypass one or more examinations of a fraud analysis, such that the one or more examinations may not need to be performed after a transaction for the product occurs.

In some implementations, an annotation generated by the fraud analysis platform may expire after a threshold time period (e.g., one day, one week, one month, one year, and/or the like). For example, if the threshold time period expires without receiving or identifying further online activity by the user that is associated with the product and/or expires without a transaction involving the product occurring, the annotation may be removed and/or erased. In such cases, the threshold time period may be set to indicate or reflect a period of time after which the user is not likely to buy a product. In some implementations, the threshold time period may be specific to a particular product, to a particular user, and/or the like, based on historical information associated with the online activity, the user's purchase history, past purchases of the product, and/or the like. In such cases, a machine learning model, such as an expiration model, may be trained based on the historical information and/or one or more parameters associated with the online activity, to determine a length of time for the threshold time period.

By way of the above, the fraud analysis platform may indicate that a user is likely to purchase a product and/or that one or more examinations of a fraud analysis can be bypassed based on an analysis of the online activity and/or a user's purchase tendency.

As shown in FIG. 1C, and by reference number 150, User A initiates a transaction involving Product 1. The transaction may involve a payment from an account (e.g., a financial account, a member account, and/or the like) associated with the user. For example, if Product 1 was a particular television, User A may purchase that particular television, another type of television (e.g., a television that is a different make, is a different model, is a different size, has one or more different specifications, and/or the like), a product related to Product 1, and/or the like. To initiate the transaction, User A may attempt to purchase the product via an online shopping portal, an in-person store (e.g., at a transaction device), and/or the like.

Based on the transaction being initiated, an authorization platform (and/or the fraud analysis platform) may detect that the transaction for the product is in process. For example, the authorization platform may receive a request to authorize the transaction. The authorization platform may be configured to authorize the transaction based on a fraud analysis of the transaction.

In this way, the authorization platform (and/or fraud analysis platform) may detect a transaction involving the product and/or the user (or an account of the user) to permit the authorization platform to perform a fraud analysis of the transaction and/or authorize the transaction.

As further shown in FIG. 1C, and by reference number 160, the authorization platform may consider the online activity and/or bypass one or more examinations of a fraud analysis based on the noted likelihood of the transaction involving Product 1. As described herein, the authorization platform may include the fraud analysis platform and/or may be communicatively coupled with the fraud analysis platform. Accordingly, the authorization platform may have access to any annotations associated with users and/or user accounts monitored by the fraud analysis platform. Therefore, based on receiving information associated with the transaction (in the request to authorize the transaction), the authorization platform may look up any annotations associated with an account (e.g., a financial account, a member account, and/or the like) involved in the transaction, a product of the transaction, a merchant of the transaction, and/or the like. For example, the authorization platform may use an account identifier (e.g., an account number of a financial account that is used in the transaction) to look up a profile of a user and identify any annotations associated with the user's online activity. Accordingly, in example implementation 100, the authorization platform may review the annotation associated with the profile of User A and identify that User A's online activity indicated that the user had interest in Product 1 and/or that the user was likely to purchase Product 1, a product associated with Product 1, a product related to Product 1, and/or the like.

The authorization platform may perform a fraud analysis according to any annotations and/or according to the online activity obtained by the fraud analysis platform, as described herein. The authorization platform may bypass one or more examinations based on the annotations and/or online activity as described herein. In some implementations, the authorization platform may be configured to bypass all examinations based on the annotations and/or an indication of preapproval of all examinations of a fraud analysis.

In some implementations, the authorization platform may be configured to perform at least one examination on each transaction. For example, the authorization platform may be configured to always confirm that any recent purchasing history does not indicate that the transaction is associated with fraud (e.g., at least five purchases within the last hour, at least 10 purchases within the last 5 hours, and/or the like). The authorization platform may be configured to perform one or more other examinations on each fraud check.

In some implementations, the authorization platform may analyze and/or obtain account information associated with the account used in the transaction. Such account information may identify a standing of the account (e.g., in good standing, on hold, suspended, and/or the like), information indicating balances of the account, information indicating credit limits of the account, information indicating a credit history and/or credit score associated with the account, and/or the like. In some implementations, the authorization platform may authorize the transaction and/or designate the transaction for preapproval based on such account information. For example, if the account is in good standing, there are adequate funds in the account, and the credit score satisfies a threshold, the authorization platform may authorize the transaction and/or pre-approve the transaction for authorization, as described herein. In some implementations, a preapproval of a transaction may be based on a purchase price for the transaction being within a threshold range of a product price identified in the online activity. For example, the fraud analysis platform may preapprove a transaction involving the product if the purchase price is less than or equal to the product price identified in the online activity. Accordingly, financial parameters may be analyzed and/or set to preapprove a transaction, as described herein.

In this way, the authorization platform may perform a fraud analysis that bypasses one or more examinations based on an annotation that is representative of a user's online activity. Accordingly, computing resources (e.g., processing resources, memory resources, and/or the like) and/or network resources (e.g., resource blocks used to communicate with one or more remote systems according to the one or more examinations) that may have been used to perform the bypassed examinations can be conserved. The authorization platform may indicate whether the transaction is to be approved or denied based on such a fraud analysis and bypassing the one or more examinations.

As further shown in FIG. 1C, and by reference number 170, the transaction is approved. The authorization platform may indicate that a transaction is approved based on the fraud analysis and/or the one or more examinations of the fraud analysis being bypassed. In example implementation 100, the authorization platform may send an authorization to authorize the transaction and enable User A to purchase Product 1. In some implementations, the authorization platform may deny the transaction (e.g., based on financial characteristics of the transaction, the user's account status (balance, credit availability, and/or the like), and/or the like).

In this way, a fraud analysis platform and/or authorization platform may monitor a user's online activity to predict whether the user is likely to purchase a product, and based on the likelihood that the user is going to purchase the product, bypass one or more examinations of a fraud analysis. As described above, bypassing one or more examinations of a fraud analysis conserves computing resources, network resources, and/or may take less time, thus enhancing a user experience when making a purchase. In some implementations, the fraud analysis platform and/or authorization platform may use the online activity to perform the fraud analysis, and thus increase accuracy with respect to detecting a fraudulent transaction. The increased accuracy conserves any computing resources and/or network resources involved in correcting any fraudulent transactions allowed and/or correcting any non-fraudulent transactions denied without the use of the example implementations described herein.

As indicated above, FIGS. 1A-1C are provided merely as an example. Other examples may differ from what was described with regard to FIGS. 1A-1C.

Figure 2:
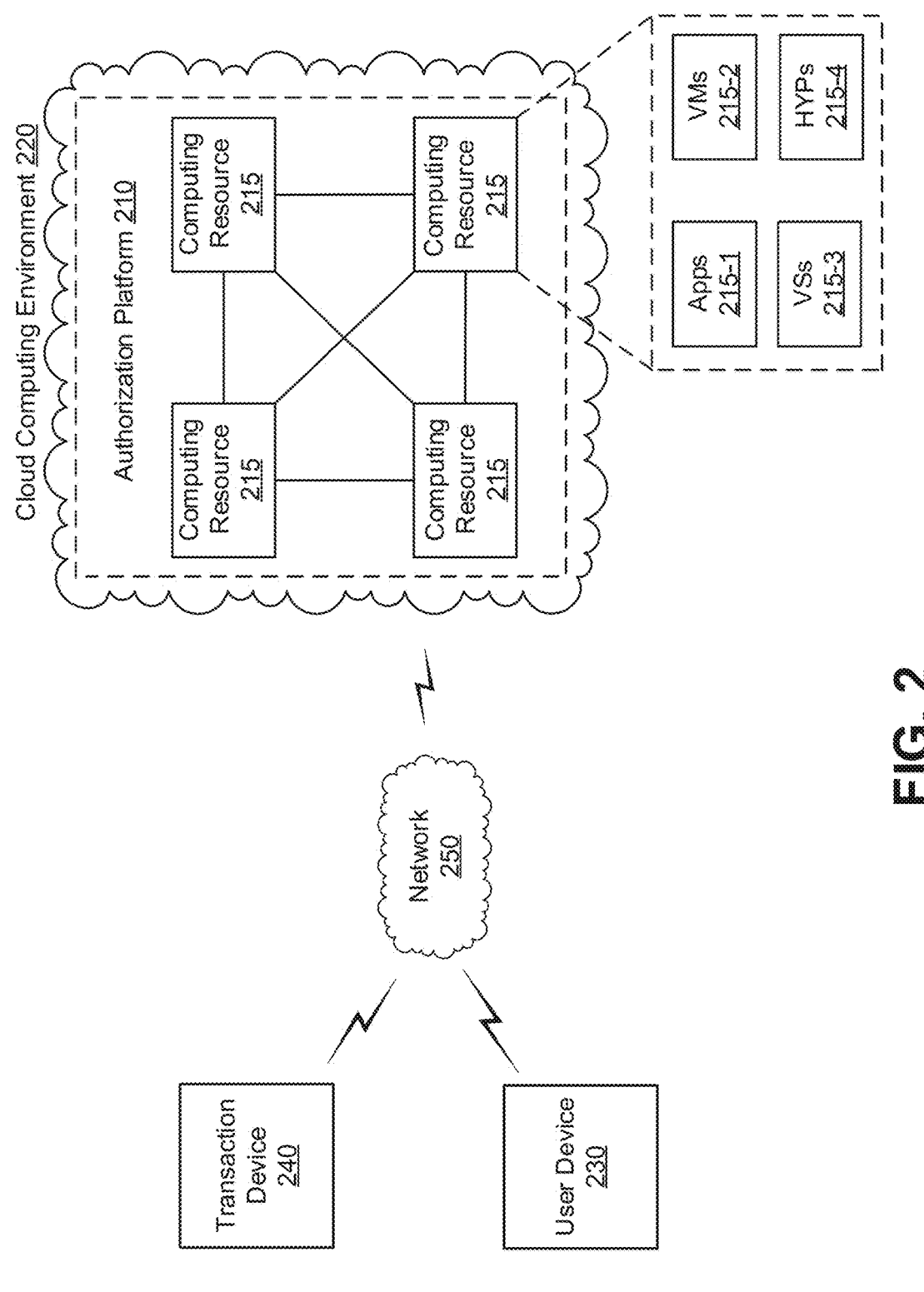
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include an authorization platform 210, a computing resource 215, a cloud computing environment 220, a user device 230, a transaction device 240, and a network 250. Devices of environment 200 may interconnect via wired connections, wireless connections, or a combination of wired and wireless connections.

Authorization platform 210 includes one or more computing resources assigned to perform preemptive transaction analysis. For example, authorization platform 210 may be a platform implemented by cloud computing environment 220 that may preemptively bypass one or more examinations of a fraud analysis performed for a transaction and/or preemptively authorize the transaction. In some implementations, authorization platform 210 is implemented by computing resources 215 of cloud computing environment 220. Authorization platform 210 may be associated with a financial institution (e.g., a bank, a credit union, and/or the like). Accordingly, authorization platform 210 may be configured to authorize one or more transactions involving one or more accounts of the financial institution. In some implementations, authorization platform 210 may include a fraud analysis platform (e.g., as described above in connection with FIGS. 1A-1C).

Authorization platform 210 may include a server device or a group of server devices. In some implementations, authorization platform 210 may be hosted in cloud computing environment 220. Notably, while implementations described herein describe authorization platform 210 as being hosted in a cloud computing environment 220, in some implementations, authorization platform 210 may be non-cloud-based or may be partially cloud-based.

Cloud computing environment 220 includes an environment that delivers computing as a service, whereby shared resources, services, etc. may be provided to user device 230 and/or transaction device 240. Cloud computing environment 220 may provide computation, software, data access, storage, and/or other services that do not require end-user knowledge of a physical location and configuration of a system and/or a device that delivers the services. As shown, cloud computing environment 220 may include authorization platform 210 and computing resource 215.

Computing resource 215 includes one or more personal computers, workstation computers, server devices, or another type of computation and/or communication device. In some implementations, computing resource 215 may host authorization platform 210. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 230. Application 215-1 may eliminate a need to install and execute the software applications on user device 230. For example, application 215-1 may include software associated with authorization platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports the execution of a complete operating system ("OS"). A process virtual machine may execute a single program, and may support a single process. In some implementations, virtual machine 215-2 may execute on behalf of a user (e.g., user device 230), and may manage the infrastructure of a cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

User device 230 includes one or more devices capable of receiving, generating, storing, processing, and/or providing information associated with receiving, storing, processing, and/or providing product information and/or purchase information. For example, user device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 230 may be associated with a user that has an account with an entity or organization associated with authorization platform 210. For example, user device 230 may be registered to a user that has a financial account with a financial institution that owns, operates, and/or utilizes authorization platform 210.

Transaction device 240 includes one or more devices capable of receiving, generating, storing, processing, and/or providing information associated with a purchase of a product. For example, transaction device 240 may include a computing device (e.g., a laptop computer, a desktop computer, a handheld computer, a mobile phone, and/or the like) via which an online portal is provided, a point of sale device at a merchant location, and/or the like.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next-generation network (NR), etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
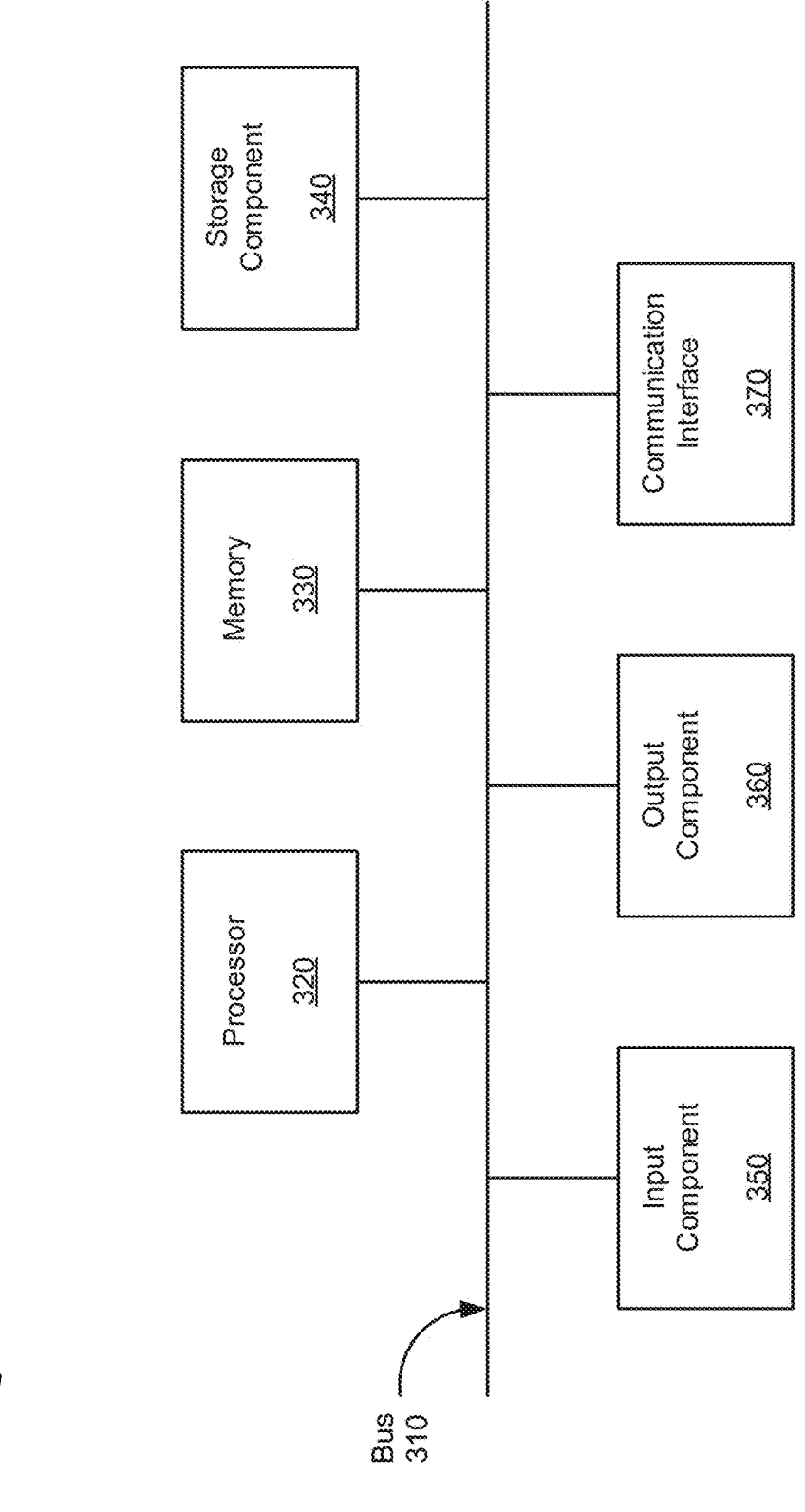
FIG. 3 is a diagram of example components of one or more devices of FIG. 2.

FIG. 3 is a diagram of example components of a device 300. Device 300 may correspond to authorization platform 210, computing resource 215, user device 230, and/or transaction device 240. In some implementations, authorization platform 210, computing resource 215, user device 230, and/or transaction device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read-only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for preemptive transaction authorization. In some implementations, one or more process blocks of FIG. 4 may be performed by an authorization platform (e.g., authorization platform 210). In some implementations, one or more process blocks of FIG. 4 may be performed by another device or a group of devices separate from or including authorization platform (e.g., authorization platform 210), such as a computing resource (e.g., computing resource 215), a user device (e.g., user device 230), and a transaction device (e.g. transaction device 240).

As shown in FIG. 4, process 400 may include receiving activity data associated with a user, wherein the activity data relates to online activity involving a product type (block 410). For example, the authorization platform (e.g., using processor 320, memory 330, the storage component 340, input component 350, communication interface 370, and/or the like) may receive activity data associated with a user, as described above. In some implementations, the activity data may relate to online activity involving a product type.

As further shown in FIG. 4, process 400 may include identifying the product type associated with the activity data (block 420). For example, the authorization platform (e.g., using processor 320, memory 330, the storage component 340, and/or the like) may identify the product type associated with the activity data, as described above.

As further shown in FIG. 4, process 400 may include predicting, based on the activity data, that the user is likely to purchase a product of the product type (block 430). For example, the authorization platform (e.g., using processor 320, memory 330, the storage component 340, and/or the like) may predict, based on the activity data, that the user is likely to purchase a product of the product type, as described above.

As further shown in FIG. 4, process 400 may include generating, based on predicting that the user is likely interested in purchasing the product of the product type, an annotation to indicate that a potential transaction to purchase the product is forthcoming (block 440). For example, the authorization platform (e.g., using processor 320, memory 330, storage component 340, and/or the like) may generate based on predicting that the user is likely interested in purchasing the product of the product type, an annotation to indicate that a potential transaction to purchase the product is forthcoming, as described above.

As further shown in FIG. 4, process 400 may include storing the annotation in a profile associated with an account of the user (block 450). For example, the authorization platform (e.g., using processor 320, memory 330, storage component 340, and/or the like) may store the annotation in a profile associated with an account of the user, as described above.

As further shown in FIG. 4, process 400 may include detecting a transaction to purchase the product, wherein the transaction involves a payment from the account (block 460). For example, the authorization platform (e.g., using processor 320, memory 330, the storage component 340, input component 350, communication interface 370, and/or the like) may detect a transaction to purchase the product, as described above. In some implementations, the transaction may involve a payment from the account.

As further shown in FIG. 4, process 400 may include performing an action associated with a fraud analysis of the transaction based on the annotation (block 470). For example, the authorization platform (e.g., using processor 320, memory 330, the storage component 340, input component 350, output component 360, communication interface 370, and/or the like) may perform an action associated with a fraud analysis of the transaction based on the annotation.

Process 400 may include additional implementations, such as any single implementation or any combination of implementations described below and/or in connection with one or more other processes described elsewhere herein.

In some implementations, the authorization platform may measure the online activity to determine an amount of the online activity, and may determine that the amount of the online activity satisfies a threshold, and, when predicting that the user is interested in purchasing the product of the product type, the authorization platform may predict that the user is interested in purchasing the product of the product type based on the amount of the online activity satisfying the threshold. In some implementations, when performing the action, the authorization platform may bypass performance of one or more examinations of the fraud analysis associated with the transaction, and may send an authorization to authorize the transaction to permit the user to purchase the product In some implementations, the authorization platform may, based on detecting the transaction, identify the profile based on an account identifier identified in the transaction, wherein the account identifier identifies the account of the user; and access the profile based on the account identifier to identify the annotation. In some implementations, predicting that the user is interested in purchasing the product of the product type may be based on an output of a machine learning model, where the machine learning model has been trained based on at least one of historical data associated with past online activity of the user, or historical data associated with past online activity of one or more other users.

In some implementations, the authorization platform may request the user to authorize monitoring of the online activity, may receive a user input that authorizes the monitoring of the online activity, and may receive the activity data based on the user input. In some implementations, the online activity may include at least one of browsing webpages associated with the product type, accessing videos or images associated with the product type, purchasing related products associated with the product type, or social media activity involving the product type.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for preemptive transaction authorization. In some implementations, one or more process blocks of FIG. 5 may be performed by an authorization platform (e.g., authorization platform 210). In some implementations, one or more process blocks of FIG. 5 may be performed by another device or a group of devices separate from or including authorization platform (e.g., authorization platform 210), such as a computing resource (e.g., computing resource 215), a user device (e.g., user device 230), and a transaction device (e.g., transaction device 240).

As shown in FIG. 5, process 500 may include receiving activity data relating to the online activity of a user (block 510). For example, the authorization platform (e.g., using processor 320, memory 330, the storage component 340, input component 350, communication interface 370, and/or the like) may receive activity data relating to the online activity of a user, as described above.

As further shown in FIG. 5, process 500 may include receiving a machine learning model, the machine learning model having been trained to identify a purchase tendency of the user (block 520). For example, the authorization platform (e.g., using processor 320, memory 330, storage component 340, input component 350, communication interface 370, and/or the like) may receive a machine learning model, the machine learning model having been trained to identify a purchase tendency of the user, as described above.

As further shown in FIG. 5, process 500 may include identifying a product associated with the activity data (block 530). For example, the authorization platform (e.g., using processor 320, memory 330, the storage component 340, and/or the like) may identify a product associated with the activity data, as described above.

As further shown in FIG. 5, process 500 may include determining, using the machine learning model, that the activity data indicates that the user is likely to purchase the product based on the purchase tendency (block 540). For example, the authorization platform (e.g., using processor 320, memory 330, the storage component 340, and/or the like) may determine, using the machine learning model, that the activity data indicates that the user is likely to purchase the product based on the purchase tendency, as described above.

As further shown in FIG. 5, process 500 may include designating a transaction to purchase the product as being preapproved so as to bypass an examination of a fraud analysis (block 550). For example, the authorization platform (e.g., using processor 320, memory 330, storage component 340, communication interface 370, and/or the like) may designate a transaction to purchase the product as being preapproved so as to bypass an examination of a fraud analysis, as described above.

As further shown in FIG. 5, process 500 may include receiving a request to authorize the transaction to purchase the product, wherein the transaction involves payment from an account associated with the user (block 560). For example, the authorization platform (e.g., using processor 320, memory 330, the storage component 340, input component 350, communication interface 370, and/or the like) may receive a request to authorize the transaction to purchase the product, as described above. In some implementations, the transaction may involve payment from an account associated with the user.

As further shown in FIG. 5, process 500 may include identifying that the transaction is designated as being preapproved (block 570). For example, the authorization platform (e.g., using processor 320, memory 330, storage component 340, and/or the like) may identify that the transaction is designated as being preapproved, as described above.

As further shown in FIG. 5, process 500 may include sending an authorization to authorize the transaction, without performing the examination of the fraud analysis, based on identifying that the transaction is designated as preapproved (block 580). For example, the authorization platform (e.g., using processor 320, memory 330, storage component 340, output component 360, communication interface 370, and/or the like) may send an authorization to authorize the transaction, without performing the examination of the fraud analysis, based on identifying that the transaction is designated as preapproved, as described above.

Process 500 may include additional implementations, such as any single implementation or any combination of implementations described below and/or in connection with one or more other processes described elsewhere herein.

In some implementations, the fraud analysis may include at least one of determining a probability that the user has authorized the transaction or verifying that the user has authorized the transaction. In some implementations, the machine learning model may have been trained based on one or more parameters associated with the online activity or associated with the user and historical data associated with purchases made by the user, where the one or more parameters include one or more of a characteristic of the user, a type of the online activity, an amount of the online activity, an object associated with the online activity, or timing of the online activity In some implementations, when designating the transaction as being preapproved, the authorization platform may store an annotation in a profile of the user, where the profile is stored as account information of the account, and where the transaction is identified as being designated as preapproved based on the annotation. In some implementations, when determining that the activity data indicates the user is likely to purchase the product, the authorization platform may identify an amount of the online activity that is associated with the product, may determine that the amount of the online activity satisfies a threshold. and may determine that the online activity indicates that the user is likely to purchase the product based on the purchase tendency and the amount of the online activity.

In some implementations, when designating the purchase as being preapproved, the authorization platform may determine account information associated with the account and may designate the transaction as being preapproved based on the account information. In some implementations, the authorization platform may determine that the online activity is associated with the user based on receiving the activity data from a user device that is associated with the user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for preemptive transaction authorization. In some implementations, one or more process blocks of FIG. 6 may be performed by an authorization platform (e.g., authorization platform 210). In some implementations, one or more process blocks of FIG. 6 may be performed by another device or a group of devices separate from or including authorization platform (e.g., authorization platform 210), such as a computing resource (e.g., computing resource 215), a user device (e.g., user device 230), and a transaction device (e.g. transaction device 240)

As shown in FIG. 6, process 600 may include receiving activity data associated with the online activity of a user (block 610). For example, the authorization platform (e.g., using processor 320, memory 330, the storage component 340, input component 350, communication interface 370, and/or the like) may receive activity data associated with the online activity of a user, as described above.

As shown in FIG. 6, process 600 may include identifying a first product associated with the activity data (block 620). For example, the authorization platform (e.g., using processor 320, memory 330, the storage component 340, and/or the like) may identify a first product associated with the activity data, as described above.

As shown in FIG. 6, process 600 may include determining that the activity data indicates that the user is likely to purchase the first product (block 630). For example, the authorization platform (e.g., using processor 320, memory 330, the storage component 340, and/or the like) may determine that the activity data indicates that the user is likely to purchase the first product, as described above.

As shown in FIG. 6, process 600 may include designating a transaction to purchase the first product as being preapproved so as to bypass a fraud analysis in a future authorization of the transaction to purchase the first product (block 640). For example, the authorization platform (e.g., using processor 320, memory 330, storage component 340, communication interface 370, and/or the like) may designate a transaction to purchase the first product as being preapproved so as to bypass a fraud analysis in a future authorization of the transaction to purchase the first product, as described above.

As shown in FIG. 6, process 600 may include, after designating the transaction as being preapproved, receiving a request to authorize a transaction to purchase a second product, wherein the transaction to purchase the second product involves payment from an account associated with the user (block 650). For example, the authorization platform (e.g., using processor 320, memory 330, storage component 340, input component 350, communication interface 370, and/or the like) may designate the transaction as being preapproved, receiving a request to authorize a transaction to purchase a second product, as described above. In some implementations, the transaction to purchase the second product may involve payment from an account associated with the user.

As shown in FIG. 6, process 600 may include determining that the second product is related to the first product (block 660). For example, the authorization platform (e.g., using processor 320, memory 330, storage component 340, and/or the like) may determine that the second product is related to the first product, as described above.

As shown in FIG. 6, process 600 may include identifying that the transaction to purchase the first product is designated as being preapproved (block 670). For example, the authorization platform (e.g., using processor 320, memory 330, storage component 340, and/or the like) may identify that the transaction to purchase the first product is designated as being preapproved, as described above.

As shown in FIG. 6, process 600 may include sending an authorization to authorize the transaction to purchase the second product based on identifying that the transaction to purchase the first product is designated as being preapproved and identifying that the first product is related to the second product (block 680). For example, the authorization platform (e.g., using processor 320, memory 330, storage component 340, output component 360, communication interface 370, and/or the like) may send an authorization to authorize the transaction to purchase the second product based on identifying that the transaction to purchase the first product is designated as being preapproved and identifying that the first product is related to the second product, as described above.

Process 600 may include additional implementations, such as any single implementation or any combination of implementations described below and/or in connection with one or more other processes described elsewhere herein.

In some implementations, the online activity may be determined to indicate that the user is likely to purchase the first product based on an output of a machine learning model that has been trained to identify a purchase tendency of the user. In some implementations, when determining that the second product is related to the first product, the authorization platform may compare a characteristic of the first product and a characteristic of the second product, and may determine that the first product is related to the second product when the characteristic of the first product substantially matches the characteristic of the second product.

In some implementations, the authorization may be sent based on a purchase price associated with the transaction to purchase the first product being greater than or equal to a purchase price associated with the transaction to purchase the second product. In some implementations, the authorization platform may bypass the fraud analysis for the transaction to purchase the second product based on the transaction to purchase the first product being designated as preapproved and the first product being determined to be related to the second product.

In some implementations, the authorization platform may determine to bypass the fraud analysis for the transaction to purchase the second product based on the transaction to purchase the first product being designated as preapproved and the first product being determined to be related to the second product, where the authorization is sent without performing the fraud analysis of the transaction to purchase the second product based on determining to bypass the fraud analysis for the transaction to purchase the second product.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of other implementations. In fact, many of these features may be combined in ways not specifically recited in the claims and/or disclosed in the specification. Although each dependent claim listed below may directly depend on only one claim, the disclosure of other implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

monitoring, by a device, activity performed on the device based on an application running on the device, wherein one or more images are associated with the monitored activity;

generating, by the device and based on processing the monitored activity using the one or more images, activity data, wherein processing the one or more images comprises analyzing the one or more images using at least one of:

a computer image processing technique that includes at least one of object detection from the one or more images, or edge detection of the one or more images, a text processing technique, or a code processing technique to recognize one or more products;

predicting, by the device and based on using a machine learning model, that a user is likely to purchase a particular type of product, wherein the machine learning model is trained to predict a likelihood of the user purchasing the particular type of product based on the activity data;

generating, by the device and based on predicting that the user is likely to purchase the particular type of product, a flag associated with a potential transaction associated with purchasing the particular type of product;

storing the flag with a profile of the user;

detecting, by the device and within a threshold time period after the generation of the flag, a transaction associated with a purchase of a product related to the particular type of product;

selectively bypassing, by the device and based on the flag, a subset of processes from one or more fraud analysis processes to be performed by the device in relation to the transaction, wherein the flag is configured to expire after the threshold time period passing without a related transaction being performed, and wherein the flag is removed or deleted from storage upon expiration;

performing, by the device and based on the bypassing, a subset of the one or more fraud analysis processes; and sending, by the device and based on performing the particular set of processes, an authorization associated with the transaction.

2. The method of claim 1, further comprising:
analyzing the activity data using an image processing technique; and
determining that the activity data is associated with the particular type of product.

3. The method of claim 1, wherein the threshold time period is determined based on historical information associated with the activity data.

4. The method of claim 1, wherein the data is received from another device.

5. The method of claim 1, wherein performing the particular set of processes comprises:
obtaining account information associated with the user; and
authorizing the transaction based on the account information.

6. The method of claim 1, wherein the bypassing comprises:
bypassing an examination process based on the flag.

7. The method of claim 1, wherein the activity is related to online activity comprising capturing an image of an item, sending a message identifying the product, accessing offline media associated with the item, purchasing related items, traveling to a location of a merchant that sells the item, or combinations thereof.

8. A device, comprising:
one or more memories; and
one or more processors, coupled to the one or more memories, configured to:
monitor, by the device, activity performed on the device based on an application running on the device,
wherein one or more images are associated with the monitored activity;
generate, based on processing the monitored activity using the one or more images, activity data,
wherein processing the one or more images comprises analyzing the one or more images using at least one of:
a computer image processing technique that includes at least one of object detection from the one or more images, or edge detection of the one or more images,
a text processing technique, or
a code processing technique to recognize one or more products;
generate, based on predicting that a user is likely to purchase a particular type of product, a flag associated with a potential transaction associated with purchasing the particular type of product and storing the flag with a profile of the user,
wherein the prediction is based on using a machine learning model that is trained to predict a likelihood of the user in purchasing the particular type of product based on the activity data;
detect, within a threshold time period after the generation of the flag, a transaction associated with a purchase of a product related to the particular type of product;
selectively bypass, based on the flag, a subset of processes from one or more fraud analysis processes to be performed by the device in relation to the transaction,
wherein the flag is configured to expire after the threshold time period passing without a related transaction being performed, and

wherein the flag is removed or deleted from storage upon expiration;
perform, based on the bypassing, a particular set of processes from one or more fraud analysis processes associated with the transaction; and
send, based on performing the particular set of processes, an authorization associated with the transaction.

9. The device of claim 8, wherein the one or more processors are further configured to:
analyze the activity data using an image processing technique; and
determine that the activity data is associated with the particular type of product.

10. The device of claim 8, wherein the threshold time period is determined based on historical information associated with the activity data.

11. The device of claim 8, wherein the one or more processors, to perform the particular set of processes, are configured to:
obtain account information associated with the user; and
authorize the transaction based on the account information.

12. The device of claim 8, wherein the one or more processors, when bypassing, are further configured to:
bypass an examination process based on the flag.

13. The device of claim 9, wherein the activity is related to online activity comprising capturing an image of a product, sending a message identifying the product, accessing offline media associated with the product, purchasing related products, traveling to a location of a merchant that sells the product, or combinations thereof.

14. The device of claim 8, wherein the monitored activity is related to at least one of:
online activity,
the one or more images that is captured by one or more camera devices,
information obtained via a radio frequency identification (RFID) device, or
location information obtained via a global positioning system (GPS) device.

15. A non-transitory computer-readable medium storing a set of instructions, the set of instructions comprising:
one or more instructions that, when executed by one or more processors of a device, cause the device to:
monitor, by the device, activity performed on the device based on an application running on the device,
wherein one or more images are associated with the monitored activity;
generate, based on processing the monitored activity using the one or more images, activity data,
wherein processing the one or more images comprises analyzing the one or more images using at least one of:
a computer image processing technique that includes at least one of object detection from the one or more images, or edge detection of the one or more images,
a text processing technique, or
a code processing technique to recognize one or more products;
generate, based on predicting that a user is likely to purchase a particular type of product, a flag associated with a potential transaction associated with purchasing the particular type of product and storing the flag with a profile of the user, wherein the prediction is based on using a machine learning model that is trained to predict a likelihood of the user in purchasing the particular type of product based on the activity data;

detect, within a threshold time period after the generation of the flag, a transaction associated with a purchase of a product related to the particular type of product;

selectively bypass, based on the flag, a subset of processes from one or more fraud analysis processes to be performed by the device in relation to the transaction, wherein the flag is configured to expire after the threshold time period passing without a related transaction being performed, and wherein the flag is removed or deleted from storage upon expiration;

perform, based on the bypassing, a set of processes from one or more fraud analysis processes associated with the transaction; and send, based on performing the particular set of processes, an authorization associated with the transaction.

16. The non-transitory computer-readable medium of claim 15, wherein the one or more instructions further cause the device to:

analyze the activity data using an image processing technique; and determine that the activity data is associated with the particular type of product.

17. The non-transitory computer-readable medium of claim 15, wherein the threshold time period is determined based on historical information associated with the activity data.

18. The non-transitory computer-readable medium of claim 15, wherein the one or more instructions, that cause the device to perform the particular set of processes, cause the device to:

obtain account information associated with the user; and authorize the transaction based on the account information.

19. The non-transitory computer-readable medium of claim 15, wherein the one or more instructions, that cause the device to bypass, further cause the device to:

bypass an examination process based on the flag.

20. The non-transitory computer-readable medium of claim 15, wherein the activity is related to online activity comprising capturing an image of an item, sending a message identifying the product, accessing offline media associated with the item, purchasing related items, traveling to a location of a merchant that sells the item, or combinations thereof.

* * * * *